UNITED STATES PATENT OFFICE.

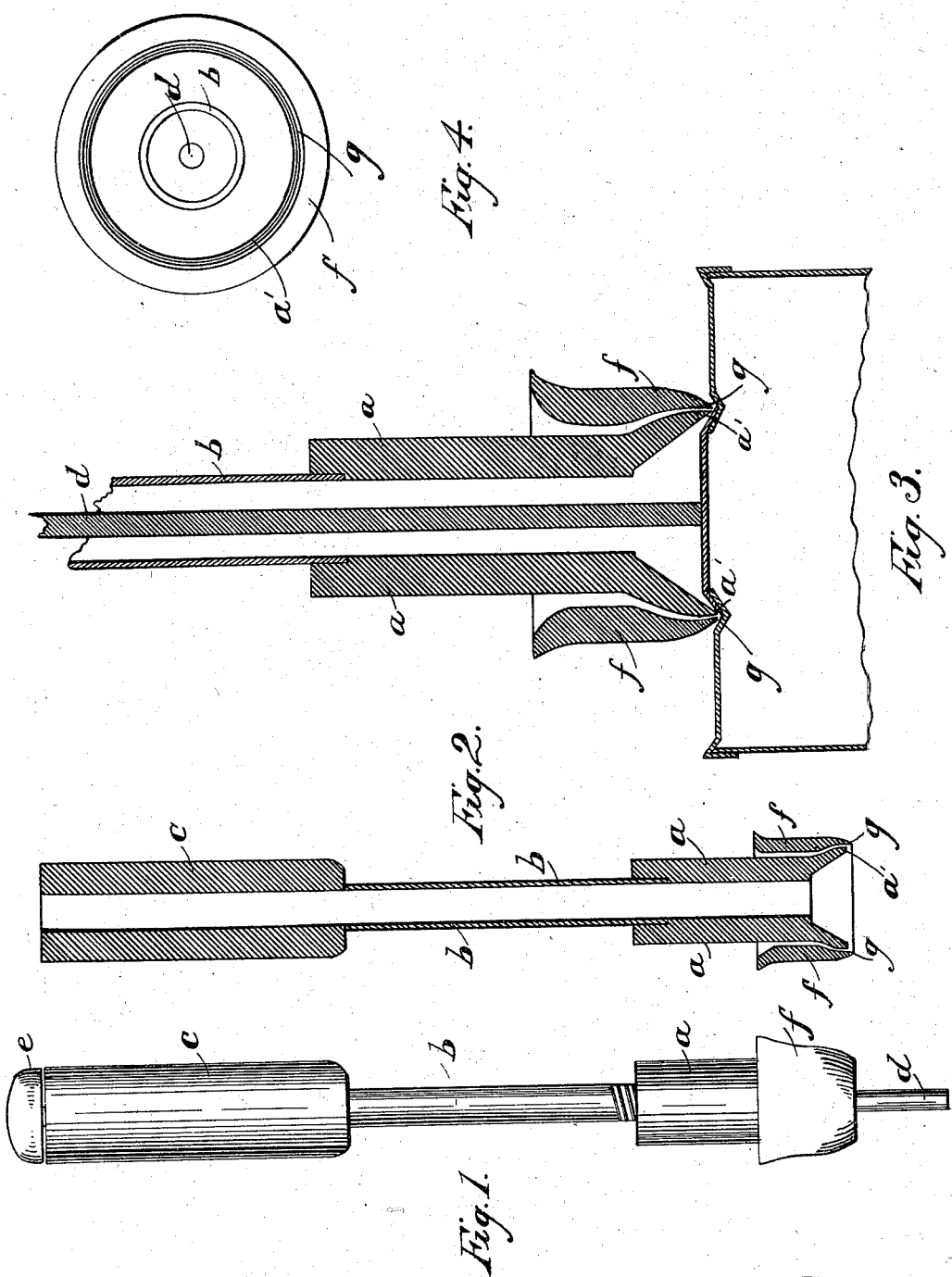

EDWARD M. LANG, JR., OF DEERING, MAINE, ASSIGNOR OF ONE-HALF TO HARTLEY C. BAXTER, OF BRUNSWICK, MAINE.

SOLDERING-TOOL.

SPECIFICATION forming part of Letters Patent No. 559,337, dated April 28, 1896.

Application filed November 29, 1895. Serial No. 570,408. (No model.)

*To all whom it may concern:*

Be it known that I, EDWARD M. LANG, Jr., a citizen of the United States, residing at Deering, in the county of Cumberland and State of Maine, have invented certain new and useful Improvements in Soldering-Tools; and I do hereby declare that the following is a full, clear, and exact description of the invention, which will enable others skilled in the art to which it appertains to make and use the same.

My invention relates to soldering-tools; and its purpose is to provide a tool of such construction that although the tinned surface of the tool be corroded in heating the tool the solder shall be invariably directed to the seam to be soldered. In the tools hitherto used the tinned surface, being exposed to the direct action of the fire or flame, by which the tool is frequently overheated, is thus often so corroded that, when the solder is applied to the side of the tool, it is liable to drop from the side in a mass instead of following down the side of the tool, as it would if the surface remained tinned, to the soldering edge.

My invention consists of a soldering-tool constructed substantially in the usual manner, and further in a ring or shield surrounding and, at the soldering edge or point, substantially of the same shape as the tool, by means of which the solder is necessarily guided to the point or seam to which it is to be applied.

In the drawings my invention is illustrated as embodied in a tool for soldering circular seams, Figure 1 being a side elevation; Fig. 2, a transverse vertical section; Fig. 3, a detail showing the lower portion of the tool and a cap or stud of the can which is to be soldered, and Fig. 4 a bottom plan.

The tool $a$ is a block, preferably of steel of substantially cylindrical shape, except that the lower part or edge is of slightly larger diameter than the parts above it, which may be concaved slightly. The bottom is slightly hollowed out, as shown in the drawings, so as to present an edge $a'$, which should be substantially, if not exactly, of the same circumference as the seam to be soldered. In the center of the tool from top to bottom is the usual circular opening. The ring or shield $f$ is an annular piece of steel or other suitable material, which in height I should prefer to be about one-third of the height of the soldering-tool; but this dimension may be varied. At the bottom the walls of the ring may be brought substantially to an edge $g$, the inner diameter of the ring at the edge being slightly in excess of the diameter of the edge $a'$. On the inside of the ring $f$ should be a slight shoulder, the interior diameter of which should be somewhat larger than the exterior diameter of the edge $a'$. This shoulder should be constructed to conform in shape to the parts of the tool $a$ just above the edge $a'$. (See Fig. 3.) The diameter of the inner wall of the shoulder should not be greater than the greatest diameter of the tool above the edge $a'$, while the upper part of the wall of the ring $f$ should extend outward or flare, as shown in the drawings. (See Fig. 3.) The ring $f$ being placed around the tool $a$, the tube $b$ is inserted into the opening through the latter. The tube $b$ may extend upward through the whole length of the handle $c$. A rod $d$ is also provided having a weight $e$ at the top, the diameter of the rod $d$ being such as to allow it to easily play through the tube $b$ and the opening through the soldering-iron $a$. Other methods of connecting the tool and the ring or shield than that shown (i. e., by means of the flaring bottom of the tool) will be readily suggested, as by vertical slots in the ring and pins in the tool $a$ passing through the slots.

The operation of the device is obvious. The tool is placed in the fire-pot or exposed to a heated blast in the ordinary manner, the tool $a$ being, if desired, preserved from contact with the coals or heat by means of the ring or shield $f$. When the tool has been heated to the required degree and it is applied to the seam—as, for instance, the cap or stud of a can—the weight of the tool $a$ presses it downward through the ring $f$ until the edge of the tool is in contact with the seam to be soldered. A piece of solder ascertained to be sufficient to solder the seam is now placed in the space between the tool $a$ and the ring or shield $f$, is melted by the heat, and runs down upon the seam through the space between the edges of the tool $a$ and of the ring $f$ and, by rotation of the tool $a$ in the ordinary manner, is spread upon the seam. When the tool is lifted, the ring $f$ falls by gravity until the shoulder thereof rests against the edge of the tool $a$, closing the opening between the ring and tool.

I do not restrict myself to any particular form of tool. It may be made to conform to the various shapes of the seams to be soldered, whether pentagonal, hexagonal, or of other shape, the ring or shield $f$ being made to conform to the shape of the tool in each instance. For long irregular seams the tool proper may be in the form of a rod (with suitable handle) drawn to a point with surrounding shield, flaring at the top and terminating at the bottom in an edge slightly larger than the point of the tool.

In the foregoing description of the operation of a circular tool constructed in accordance with my invention it has been assumed that the tool is operated by hand. The larger field, however, for the use of this tool is in capping-machines wherein the tools are constantly revolving and, at the same time, are exposed to the action of the heat, which, being incapable of exact control, frequently overheats the iron, with the attendant evils hereinbefore set out.

What I claim is—

1. A soldering-tool in combination with a ring or shield surrounding the tool and loosely connected therewith, the inner circumference of the lower edge of said ring being slightly larger than the outer circumference of the soldering edge of said tool, substantially as described.

2. A soldering-tool in combination with a ring or shield surrounding said tool, the inner circumference of the lower edge of said ring being slightly larger than the outer circumference of the soldering edge of said stool, the combined width of said edges being substantially of the same width as the seam to be soldered, substantially as described.

3. A soldering-tool in combination with a ring or shield surrounding the tool, there being a passage between said tool and said ring, the lower edge of said ring being substantially in the same plane as the soldering edge of said tool, substantially as described.

In testimony that I claim the foregoing as my invention I have hereunto set my hand this 25th day of November, A. D. 1895.

EDWARD M. LANG, Jr.

In presence of—
 Geo. E. Bird,
 A. C. Berry.